United States Patent
Kitan (10) Patent No.: US 10,705,478 B2
(45) Date of Patent: Jul. 7, 2020

(54) CLEANING DEVICE AND IMAGE FORMING APPARATUS

(71) Applicant: CANON KABUSHIKI KAISHA, Tokyo (JP)

(72) Inventor: Tomonori Kitan, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 15/976,204

(22) Filed: May 10, 2018

(65) Prior Publication Data
US 2018/0335729 A1    Nov. 22, 2018

(30) Foreign Application Priority Data

May 19, 2017 (JP) ................... 2017-100219

(51) Int. Cl.
| | | |
|---|---|---|
| G03G 21/00 | (2006.01) | |
| G03G 15/16 | (2006.01) | |
| G03G 21/12 | (2006.01) | |
| G03G 21/18 | (2006.01) | |
| G03G 15/08 | (2006.01) | |
| H04N 1/00 | (2006.01) | |

(52) U.S. Cl.
CPC ..... *G03G 21/0029* (2013.01); *G03G 15/0815* (2013.01); *G03G 15/0817* (2013.01); *G03G 15/0882* (2013.01); *G03G 15/168* (2013.01); *G03G 21/12* (2013.01); *G03G 21/18* (2013.01); *H04N 1/00909* (2013.01)

(58) Field of Classification Search
CPC ............. G03G 15/168; G03G 21/0011; G03G 21/0029; G03G 21/007
See application file for complete search history.

(56) References Cited

U.S. PATENT DOCUMENTS

| | | | | |
|---|---|---|---|---|
| 5,809,374 A | * | 9/1998 | Tsuda ................. | G03G 21/1832 399/102 |
| 2009/0087217 A1 | * | 4/2009 | Norris ................. | G03G 21/181 399/109 |
| 2016/0209799 A1 | * | 7/2016 | Kubota .............. | G03G 21/0029 |

FOREIGN PATENT DOCUMENTS

| | | |
|---|---|---|
| JP | H10-55127 A | 2/1998 |
| JP | 2000-132040 A | 5/2000 |
| JP | 2001-331070 A | 11/2001 |
| JP | 2009-047908 A | 3/2009 |

* cited by examiner

*Primary Examiner* — Carla J Therrien
(74) *Attorney, Agent, or Firm* — Venable LLP

(57) ABSTRACT

A cleaning device includes a cleaning portion including a blade and a blade supporting member having a flat surface portion, and a cleaning frame including a mounting portion, a disposing portion and an accommodating portion. The disposing portion opposes the flat surface portion with a gap with respect to a thickness direction. The accommodating portion is adjacent to respective sides of the disposing portion with respect to a height direction. A distance between the flat surface portion and the accommodating portion with respect to the thickness direction is larger than the gap. The cleaning device includes a sealing member formed of a thermoplastic resin material and configured to seal the gap by a portion extending in a longitudinal direction between the disposing portion and the flat surface portion. A part of the sealing member is accommodated in the accommodating portion.

14 Claims, 9 Drawing Sheets

CLEANING DEVICE AND IMAGE FORMING APPARATUS

FIELD OF THE INVENTION AND RELATED ART

The present invention relates to a cleaning device for use with an image forming apparatus, such as a copying machine, a printer or a facsimile machine, using an electrophotographic type or an electrostatic recording type, and relates to the image forming apparatus.

Conventionally, for example, in the image forming apparatus using the electrophotographic type, a cleaning blade has been widely used as a cleaning member for removing toner as a developer from a photosensitive drum as an image bearing member. The cleaning blade includes, in general, a blade portion formed of a rubber material and a supporting portion by which the blade portion is fixed. The blade portion is contacted to a surface of the photosensitive drum, and the supporting portion is fixed to a frame constituting an accommodating portion of the toner.

In order to maintain straightness of the cleaning blade with respect to a longitudinal direction with reliability or for the like purpose, the supporting portion is fixed to the frame at two points (fixing portions) in the neighborhood of both longitudinal end portions thereof in many cases. Between the fixing portions, a gap generates between the supporting portion and the frame. For that reason, in order to prevent toner, accommodated in the accommodating portion, from leaking through the gap, an elastic seal member is provided between the supporting portion and the frame in some cases.

Japanese Laid-Open Patent Application 2000-132040 discloses that a belt-like elastic seal member formed of an urethane foam rubber is provided in a gap between a cleaning (device) frame and a metal plate to which an elastic blade is fixed.

Incidentally, as regards the cleaning blade, a free end position of the blade portion relative to a flat surface of the supporting portion varies with respect to tolerance. For example, in the case where the gap between the supporting portion and the frame varies in an increasing direction, there is a liability that a sealing property of the elastic seal member becomes insufficient and thus the toner leaks. Further, in the case where the gap between the supporting portion and the frame varies in a decreasing direction, there is a liability that a repelling force of the elastic seal member becomes large and thus has the influence on straightness of the cleaning blade.

SUMMARY OF THE INVENTION

According to an aspect of the present invention, there is provided a cleaning device for removing toner from a surface of an image bearing member, comprising: a cleaning portion including a blade and a blade supporting member, wherein the blade is contacted to the image bearing member at one edge portion with respect to a height direction perpendicular to a longitudinal direction and a thickness direction of the blade, and wherein the blade supporting member is a plate-like member including a flat surface portion and supports the blade at a position opposite from the edge portion with respect to the height direction; a cleaning frame on which the cleaning portion is mounted and including a mounting portion, a disposing portion and an accommodating portion at a position opposing the flat surface portion, wherein the mounting portion is provided at a position corresponding to each of neighborhoods of end portions of the flat surface portion with respect to the longitudinal direction, and the blade supporting member is mounted on the cleaning frame at the mounting portion, wherein the disposing portion opposes the flat surface portion with a gap with respect to the thickness direction and extends in the longitudinal direction in a region between the mounting portions with respect to the longitudinal direction, and wherein the accommodating portion is adjacent to respective sides of the disposing portion with respect to the height direction, and extends in the longitudinal direction, a distance between the flat surface portion and the accommodating portion with respect to the thickness direction being larger than the gap; and a sealing member formed of a thermoplastic resin material having flowability and viscosity in a heat-fusing state and configured to seal the gap by a portion thereof extending in the longitudinal direction between the disposing portion and the flat surface portion, wherein a part of the sealing member is accommodated in the accommodating portion.

According to another aspect of the present invention, there is provided an image forming apparatus comprising: an image bearing member; a toner image forming portion configured to form a toner image on a surface of the image bearing member; a cleaning device configured to remove toner from the surface of the image bearing member the cleaning device, comprising: a cleaning portion including a blade and a blade supporting member, wherein the blade is contacted to the image bearing member at one edge portion with respect to a height direction perpendicular to a longitudinal direction and a thickness direction of the blade, and wherein the blade supporting member is a plate-like member including a flat surface portion and supports the blade at a position opposite from the edge portion with respect to the height direction; a cleaning frame on which the cleaning portion is mounted and including a mounting portion, a disposing portion and an accommodating portion at a position opposing the flat surface portion, wherein the mounting portion is provided at a position corresponding to each of neighborhoods of end portions of the flat surface portion with respect to the longitudinal direction, and the blade supporting member is mounted on the cleaning frame at the mounting portion, wherein the disposing portion opposes the flat surface portion with a gap with respect to the thickness direction and extends in the longitudinal direction in a region between the mounting portions with respect to the longitudinal direction, and wherein the accommodating portion is adjacent to respective sides of the disposing portion with respect to the height direction, and extends in the longitudinal direction, a distance between the flat surface portion and the accommodating portion with respect to the thickness direction being larger than the gap; and a sealing member formed of a thermoplastic resin material having flowability and viscosity in a heat-fusing state and configured to seal the gap by a portion thereof extending in the longitudinal direction between the disposing portion and the flat surface portion, wherein a part of the sealing member is accommodated in the accommodating portion.

Further features of the present invention will become apparent from the following description of exemplary embodiments with reference to the attached drawings.

BRIEF DESCRIPTION OF THE DRAWINGS

Parts (a) and (b) of FIG. 9 are sectional views for illustrating a mounting procedure of the cleaning blade.

Parts (a) and (b) of FIG. 10 are sectional views for illustrating the mounting procedure of the cleaning blade.

DESCRIPTION OF EMBODIMENTS

A cleaning device and an image forming apparatus according to the present invention will be described specifically with reference to the drawings.

Embodiment 1

1. General Constitution and Operation of Image Forming Apparatus

Figure 1:
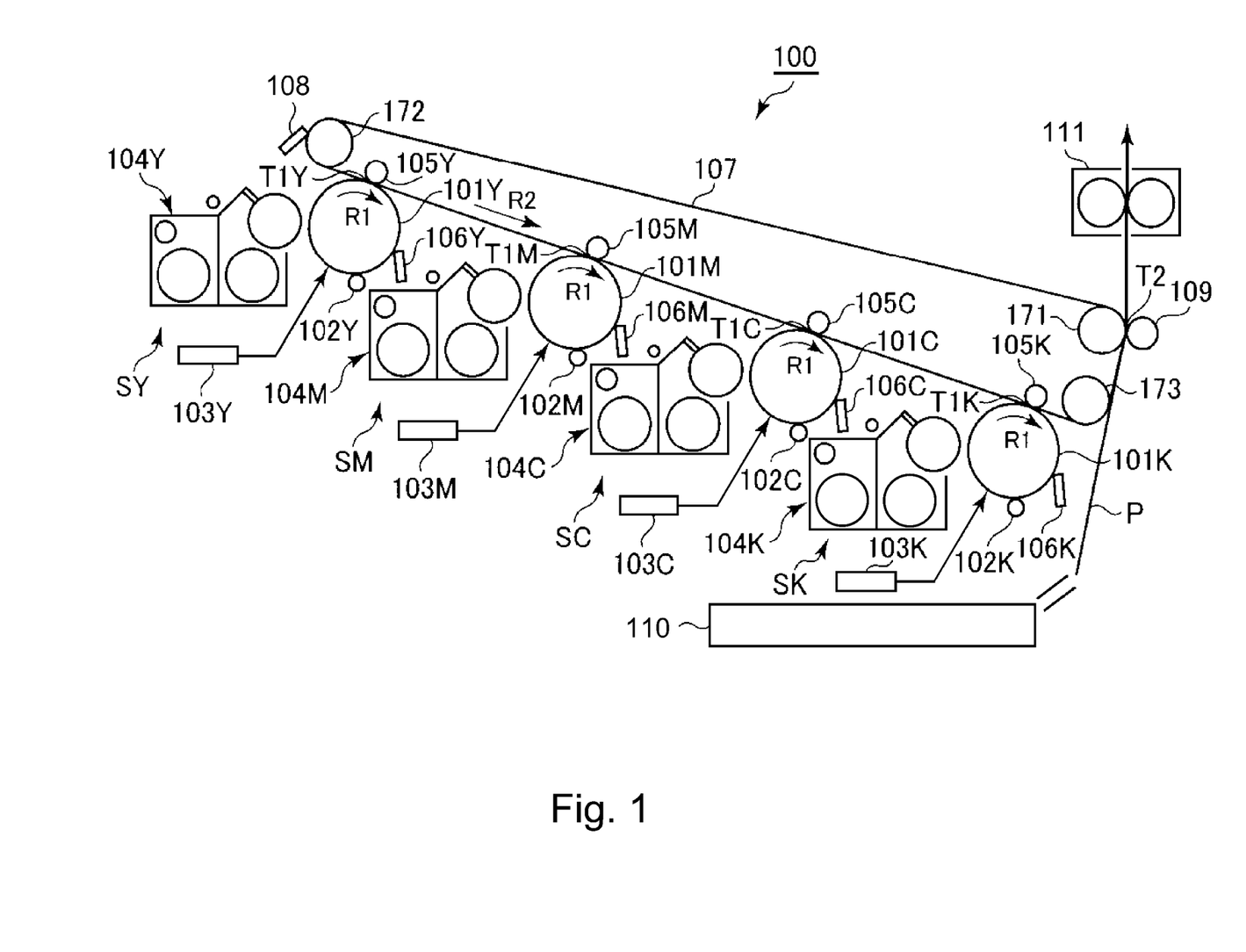
FIG. 1 is a schematic sectional view of an image forming apparatus.

FIG. 1 is a schematic sectional view of an image forming apparatus 100 according to an embodiment of the present invention. The image forming apparatus 100 of this embodiment is a tandem-type laser beam printer which is capable of forming a full-color image using an electrophotographic type and which employs an intermediary transfer type.

The image forming apparatus 100 includes, as a plurality of image forming portions (stations), first to fourth image forming portions SY, SM, SC and SK for forming images of yellow (Y), magenta (M), cyan (C) and black (K), respectively. In this embodiment, constitutions and operations of the image forming portions SY, SM, SC and SK are substantially the same except that the colors of toners used are different from each other. Accordingly, in the case where particular distinction is not required, suffixes Y, M, C and K for representing elements for associated colors are omitted, and the elements will be collectively described. In this embodiment, the image forming portion S is constituted by including a photosensitive drum 101, a charging roller 102, an exposure device 103, a developing device 104, a primary transfer roller 105 and a drum cleaning device 106.

The image forming apparatus 100 includes the photosensitive drum 101 which is a drum-shaped (cylindrical) electrophotographic photosensitive member as an image bearing member. In this embodiment, the photosensitive drum 101 is prepared by forming a photosensitive layer having a negative charge polarity on an outer peripheral surface of a cylindrical aluminum cylinder. The photosensitive drum 10 which is a rotatable member is rotationally driven in an arrow R1 direction in FIG. 1 at a predetermined peripheral speed (process speed). A surface of the rotating photosensitive drum 101 is electrically charged uniformly to a predetermined polarity (negative in this embodiment) and to a predetermined potential by the charging roller 102 which is a roller-shaped charging member. The charging roller 102 is contacted to the surface of the photosensitive drum 101 and is rotated by rotation of the photosensitive drum 101. The charged surface of the photosensitive drum 101 is subjected to scanning exposure to light depending on image information by the exposure device (laser scanner) 103 as an exposure means, so that an electrostatic (latent) image is formed on the photosensitive drum 101. The exposure device 103 writes (forms) the electrostatic image on the surface of the photosensitive drum 101 by irradiating the surface of the photosensitive drum 101 with a laser beam by scanning through a rotating mirror. The electrostatic image formed on the photosensitive drum 101 is developed (visualized) with a developer by the developing device 104 as a developing means, so that a toner image (developer image) is formed on the photosensitive drum 101. The developing device 104 uses, as the developer, a two-component developer including toner (non-magnetic toner particles) and a carrier (magnetic carrier particles).

An intermediary transfer belt 107 constituted by an endless belt as an intermediary transfer member is provided so as to oppose the respective photosensitive drums 101 of the respective image forming portions S. The intermediary transfer belt 107 is extended and stretched under application of a predetermined tension by, as a plurality of stretching rollers, a driving roller 171, a tension roller 172 and a follower (driven) roller 173. The intermediary transfer belt 107 which is a rotatable member is rotated (moved and circulated) in an arrow R2 direction in FIG. 1 by rotational drive of the driving roller 171. In the inner peripheral surface side of the intermediary transfer belt 107, at positions opposing the respective photosensitive drums 107, primary transfer rollers 105 which are primary transfer means are provided. Each of the primary transfer rollers 105 is urged (pressed) against an inner peripheral surface of the intermediary transfer belt 107 toward the associated photosensitive drum 101, so that a primary transfer portion T1 where the intermediary transfer belt 107 and the photosensitive drum 101 contact each other is formed. The toner image formed on the photosensitive drum 101 is primary-transferred at the primary transfer portion T1 onto the rotating intermediary transfer belt 107 by the action of an electrostatic force and a pressure which are imparted by the primary transfer roller 105. During a primary transfer step, to the primary transfer roller 105, a primary transfer voltage which is a DC voltage of an oppose polarity (positive in this embodiment) to a (normal) charge polarity of the toner during development is applied. For example, during full-color image formation, the toner images, of the respective colors of yellow, magenta, cyan and black, formed on the respective photosensitive drums 101 are successively transferred superposedly onto the intermediary transfer belt 107.

In the outer peripheral surface side of the intermediary transfer belt 107, at a position opposing the driving roller 171 also functioning as a secondary transfer opposite roller, a secondary transfer roller 109 which is a roller-shaped secondary transfer member as a secondary transfer means is provided. The secondary transfer roller 109 is urged (pressed) against the intermediary transfer belt 107 toward the driving roller 171, so that a secondary transfer portion T2 where the intermediary transfer belt 107 and the secondary transfer roller 109 contact each other is formed. The toner images formed on the intermediary transfer belt 107 are secondary-transferred, at the secondary transfer portion T2, a recording material P such as paper nipped and fed by the intermediary transfer belt 107 and the secondary transfer roller 109, by the action of an electrostatic force and a pressure which are imparted by the secondary transfer roller 109. During a secondary transfer step, to the secondary transfer roller 109, a secondary transfer voltage which is a DC voltage of the opposite polarity to the normal charge polarity of the toner is applied.

The recording material P is accommodated in a recording material cassette 110 and is supplied to the secondary transfer portion T2 while being timed to the toner images on the intermediary transfer belt 107, by a feeding (conveying) device (not shown) including a feeding roller, a conveying roller, a registration roller and the like. Further, the recording material P on which the toner images are transferred is conveyed to a fixing device 111 as a fixing means and is heated and pressed by the fixing device 111, so that the toner images are fixed on a surface of the recording material P. Thereafter, the recording material P is discharged (outputted) to an outside of an apparatus main assembly of the image forming apparatus 100.

On the other hand, toner (primary transfer residual toner) remaining on the photosensitive drum 101 during the primary transfer step is removed and collected from the photosensitive drum 106 as a photosensitive member cleaning means. Further, in the outer peripheral surface side of the intermediary transfer belt 107, at a position opposing the tension roller 172, an intermediary transfer belt cleaning device 108 as an intermediary transfer member cleaning means is provided. Toner (secondary transfer residual toner) remaining on the intermediary transfer belt 107 during the secondary transfer step is removed and collected from the intermediary transfer belt 107 by a belt cleaning device 108. Specifically, as described later, the drum cleaning device 106 is contacted to the surface of the photosensitive drum 101 at a predetermined contact pressure (press-contact force) at an edge portion of a blade portion, formed of an elastic material, of a cleaning blade thereof. Then, the primary transfer residual toner is scraped off the surface of the photosensitive drum 101 by the cleaning blade. Similarly, the belt cleaning device 108 is contacted to the surface of the intermediary transfer belt 107, wound about the tension roller 172, at a predetermined contact pressure (press-contact force) at an edge portion of a blade portion, formed of an elastic material of a cleaning blade thereof. Then, the secondary transfer residual toner is scraped off the surface of the intermediary transfer belt 107 by the cleaning blade.

In this embodiment, the image forming apparatus 100 includes a cleaning roller 113 (FIG. 3) as a charging member cleaning means for cleaning the surface of the charging roller 102. The cleaning roller 113 is contacted to the surface of the charging roller 102 and is rotated by rotation of the charging roller 102, and cleans the surface of the charging roller 102.

In this embodiment, at each of the image forming portions S, the photosensitive drum 101, the charging roller 102, the cleaning roller 113 and the drum cleaning device 106 integrally charge a drum cartridge 112 (FIGS. 2 and 3) detachably mountable to the apparatus main assembly of the image forming apparatus 100.

2. Structure of Drum Cleaning Device

Figure 2:
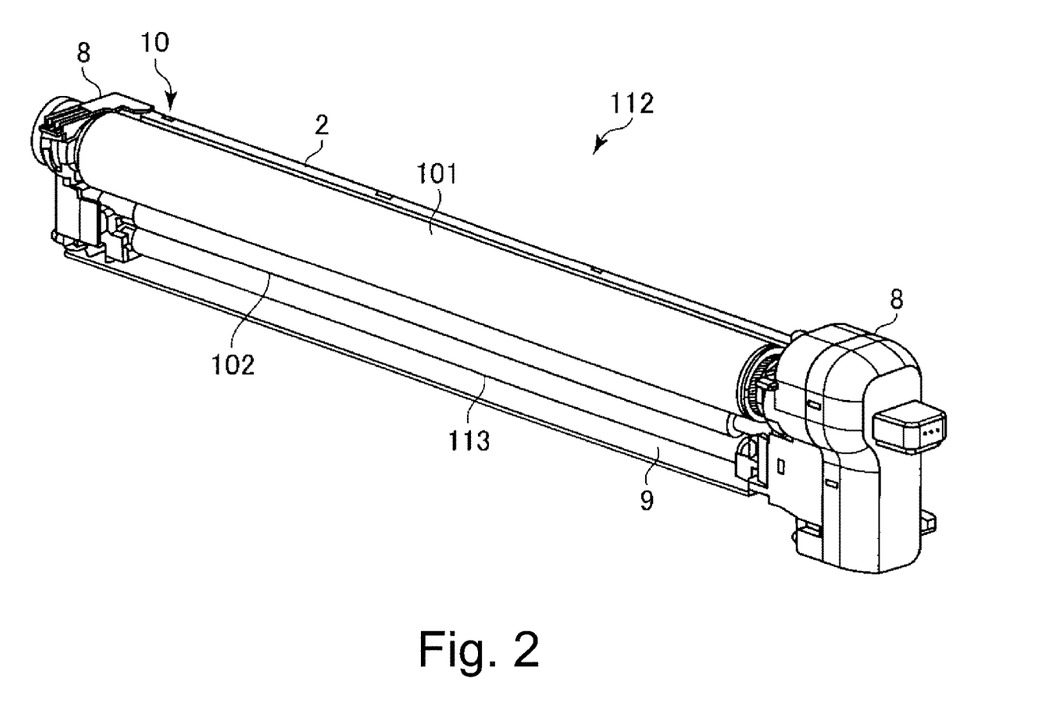
FIG. 2 is a perspective view of a drum cartridge.
Figure 3:
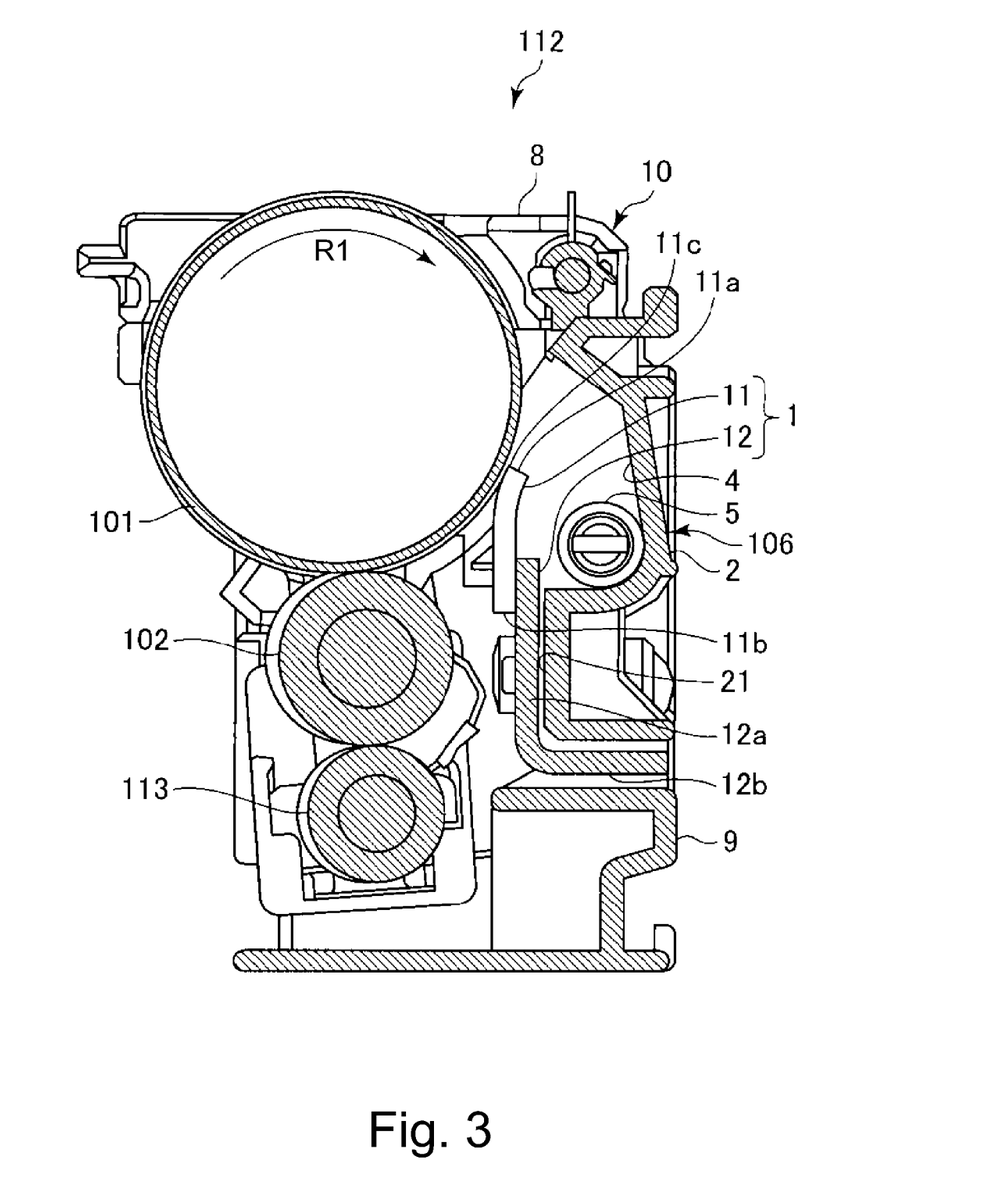
FIG. 3 is a sectional view of the drum cartridge.

Next, the drum cleaning device 106 in this embodiment will be described. FIG. 2 is a perspective view of an outer appearance of the drum cartridge 112. FIG. 3 is a sectional view (cross section substantially perpendicular to a rotational axis direction of the photosensitive drum 101) of the drum cartridge 112.

The drum cartridge 112 is prepared by integrally assembling the photosensitive drum 101, the charging roller 102, the cleaning roller 113 and the cleaning device 106 with a cartridge frame 10, and is made detachably mountable to the apparatus main assembly of the image forming apparatus 100. The cartridge frame 10 is roughly constituted by including a cleaning frame 2 constituting the cleaning device 106, an end portion frame 8 provided on each of both end portion sides of the photosensitive drum 101 with respect to the rotational axis direction, and a bottom frame 9 provided on a lower side with respect to a direction of gravitation in this embodiment. The cleaning frame 2, the end portion frame 8 and the bottom frame 9 are formed of plastic and are connected with each other by an arbitrary fixing means such as welding, bonding or fastening. Incidentally, all or part of the cleaning frame 2, the end portion frame 8 and the bottom frame 9 may also be integrally formed (molded). Each of the photosensitive drum 101, the charging roller 102 and the cleaning roller 113 is rotatably supported by the end portion frame 8 at both end portions thereof with respect to the rotational axis direction.

The cleaning device 106 includes a cleaning blade 1 as a cleaning member, an accommodating portion 4 formed with the cleaning frame (cleaning container) 2, and a feeding screw 5 as a feeding member. The cleaning blade 1 removes the toner from the surface of the photosensitive drum 101. The accommodating portion 4 accommodates the toner removed from the surface of the photosensitive drum 101 by the cleaning blade 1. The feeding screw 5 feeds the toner accommodated in the accommodating portion 4.

The cleaning blade 1 includes a blade portion 11 which is an elastic member formed of a rubber material (urethane rubber in this embodiment) as an elastic material and includes a supporting portion (supporting plate) 12 to which the blade portion 11 is fixed.

The blade portion 11 is a substantially rectangular plate-like member, in a plan view, which is disposed along (in this embodiment, substantially parallel to) the rotational axis direction of the photosensitive drum 101 and which has a predetermined length and a predetermined thickness with respect to a longitudinal direction and a widthwise direction substantially perpendicular to the longitudinal direction. The blade portion 11 is contacted to the surface of the photosensitive drum 101 at its free end portion 11a which is one widthwise end portion thereof, and is fixed to the supporting portion 12 at its fixed end portion 11b which is the other widthwise end portion thereof. The blade portion 11 is contacted to the surface of the photosensitive drum 101 in a counter direction such that the free end portion with respect to the widthwise direction is oriented toward an upstream side of the rotational direction of the photosensitive drum 101.

The supporting portion 12 is formed with a metal plate of about 2 mm in plate thickness. The supporting portion 12 includes a vertical plate portion 12a and a lateral plate portion 12b which are formed by bending a substantially rectangular metal plate, in a plan view, in a substantially L-character shape along the longitudinal direction. The blade portion 11 is fixed by bonding to a free end-side predetermined range of the vertical plate portion 12a of the supporting portion 12 at a predetermined widthwise range thereof on the fixed end portion 11b side. The supporting portion 12 is fixed to the cleaning frame 2 as specifically described later. Further, the supporting portion 12 presses an edge portion (also referred to as a blade edge portion) 11c, of the free end portion of the blade portion 11 on the photosensitive drum 101 side, against the surface of the photosensitive drum 101, so that the blade portion 11 is flexed. As a result, a predetermined contact pressure of the blade edge portion 11c to the surface of the photosensitive drum 101 can be obtained.

The cleaning blade 1 scrapes the toner off the surface of the photosensitive drum 101 by the blade edge portion 11c. In the case where the contact pressure of the blade edge portion 11c to the surface of the photosensitive drum 101 is excessively weak, "slip-through" such that the toner slips through the blade portion 11 generates and thus improper cleaning generates. On the other hand, the contact pressure is excessively strong, a surface, other than the blade edge portion 11c, of the cleaning blade 1 contacts the surface of the photosensitive drum 101 in an amount more than a tolerable amount. As a result, the slip-through generates and thus the improper cleaning generates, or wearing (abrasion) of the blade edge portion 11c is accelerated and thus a lifetime of the cleaning blade 1 lowers in some cases. For that reason, it is important that the contact pressure of the blade edge portion 11c to the surface of the photosensitive drum 101 is caused to fall within a predetermined range in order to exhibit a good cleaning performance of the cleaning device 106.

The toner removed from the surface of the photosensitive drum 101 by the cleaning blade 1 is accommodated in the accommodating portion 4. The toner accommodated in the accommodating portion 4 is fed in the accommodating portion 4 along the rotational axis direction of the photosensitive drum 1 by the feeding screw 5, and is discharged to an outside of the accommodating portion 4. The toner discharged to the outside of the accommodating portion 4 is stored in a collecting container (not shown) provided detachably mountable to the apparatus main assembly of the image forming apparatus 100. When an inside of the collecting container is filled with the toner, the collecting container is exchanged to a blank collecting container.

Here, a length of the photosensitive drum 101 with respect to the rotational axis direction is determined by a size of the recording material P capable of permitting image formation thereon in the image forming apparatus 100 or by a size of an image which can be formed in the image forming apparatus 100. In this embodiment, the image forming apparatus 100 is capable of forming an image on an A3-sized recording material P, and the length of the photosensitive drum 101 with respect to the rotational axis direction is about 400 mm. Correspondingly thereto, in this embodiment, a length of the blade portion 11 with respect to the rotational axis direction is set at about 320 mm close to a short edge-side length of the A3-sized recording material P. It is important that the blade edge portion 11c contacts the surface of the photosensitive drum 101 with a substantially uniform contact pressure with respect to the longitudinal direction of the blade portion 11. When the contact pressure causes non-uniformity with respect to the longitudinal direction of the blade portion 11, the non-uniformity causes generation of the improper cleaning, turning-up of the blade portion 11 (i.e., turning-up of the free end portion of the blade portion 11 toward a downstream side of the rotational direction of the photosensitive drum 101).

In addition to the substantially uniform contact pressure of the blade edge portion 11c to the surface of the photosensitive drum 101 with respect to the longitudinal direction of the blade portion 11, it is desired that a penetration amount (penetration distance) of the blade edge portion 11c into the surface of the photosensitive drum 101 is appropriate. Incidentally, the penetration amount is a distance from the surface of the photosensitive drum 101 to the blade edge portion 11c with respect to a radial direction of the photosensitive drum 101 in the case where it is assumed that the blade portion 11 is not deformed by the surface of the photosensitive drum 101. For example, in the case where the penetration amount is excessively large, the blade portion does not contact the surface of the photosensitive drum 101 at the blade edge portion 11c thereof and thus causes the slip-through. On the other hand, in the case where the penetration amount is excessively small, there is a possibility that the slip-through due to insufficient contact pressure and the turning-up of the blade portion 11 due to a relative increase in contact angle of the blade portion 11 to the surface of the photosensitive drum 101 generates. Further, it is desired that a change in contact pressure with time due to use of the blade portion 11, which is the elastic member, in a flexed state and a change in friction resistance of the surface of the photosensitive drum 101 due to wearing of the surface of the photosensitive drum 101 by friction with the blade portion 11 are also taken into consideration.

For this reason, a relative position of the blade portion 11 to the photosensitive drum 101 is required to achieve high accuracy such that an error thereof falls within 100 µm, for example. As in this embodiment, the cleaning blade 1 having a constitution in which the blade portion 11 which is the elastic member formed of the urethane rubber or the like is mounted to the supporting portion 12 formed of the metal plate or the like has advantages such that the constitution is relatively simple and relatively inexpensive. On the other hand, as regards the cleaning blade 1 having such a constitution, a variation (difference among individuals or a lot difference) in free end position (position of the blade edge portion 11c) of the blade portion 11 relative to a flat surface of the supporting portion 12. For that reason, in this embodiment, as specifically described later, the cleaning device 106 is provided with a position adjusting mechanism for adjusting the relative position of the blade portion 11 to the photosensitive drum 101. In this embodiment, by the position adjusting mechanism, the relative position of the blade portion 11 to the photosensitive drum 101 is adjusted and the penetration amount of the blade edge portion 11c into the surface of the photosensitive drum 101 is adjusted, so that the contact pressure of the blade edge portion 11c to the surface of the photosensitive drum 101 is adjusted.

3. Constitution for Mounting Cleaning Blade

Figure 4:
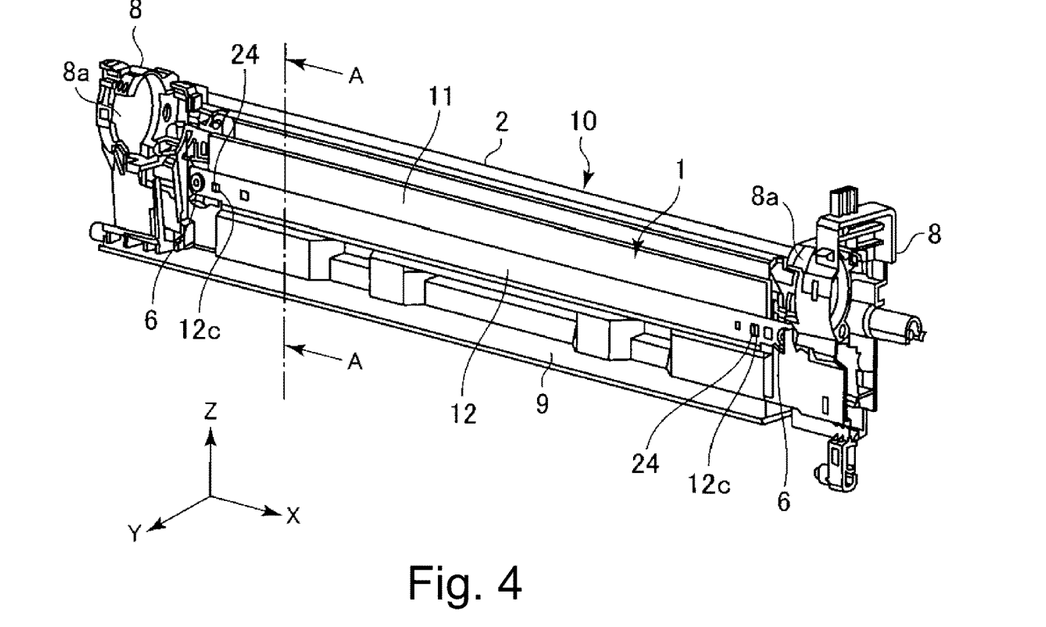
FIG. 4 is a perspective view of a frame of the drum cartridge.
Figure 5:
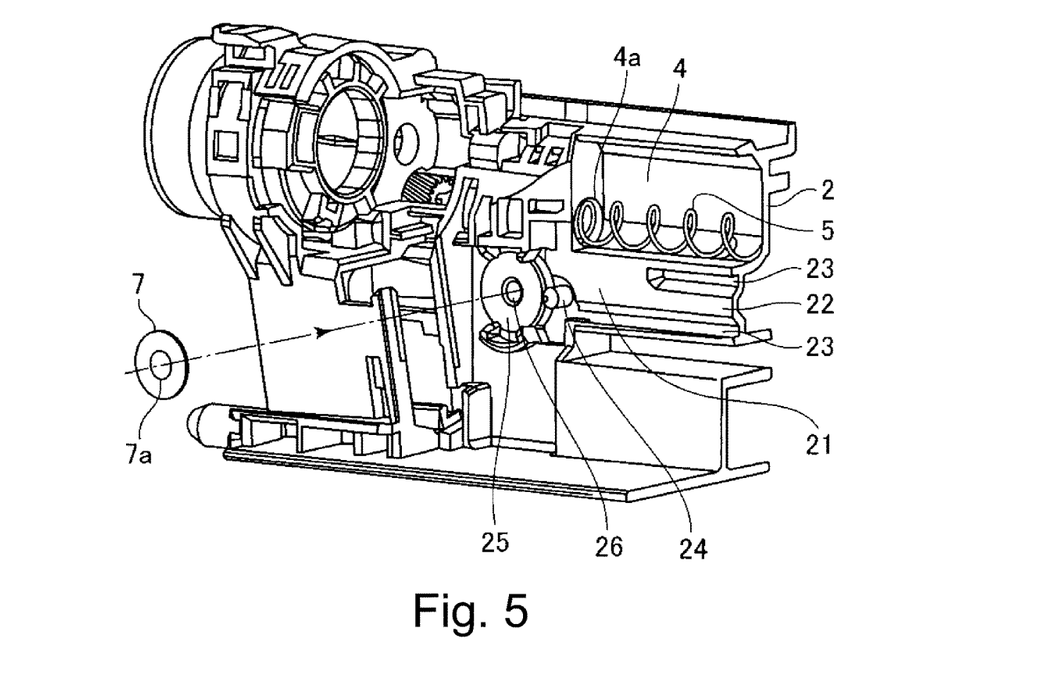
FIGS. 5, 6 and 7 are perspective views for illustrating a mounting structure of a cleaning blade.
Figure 6:
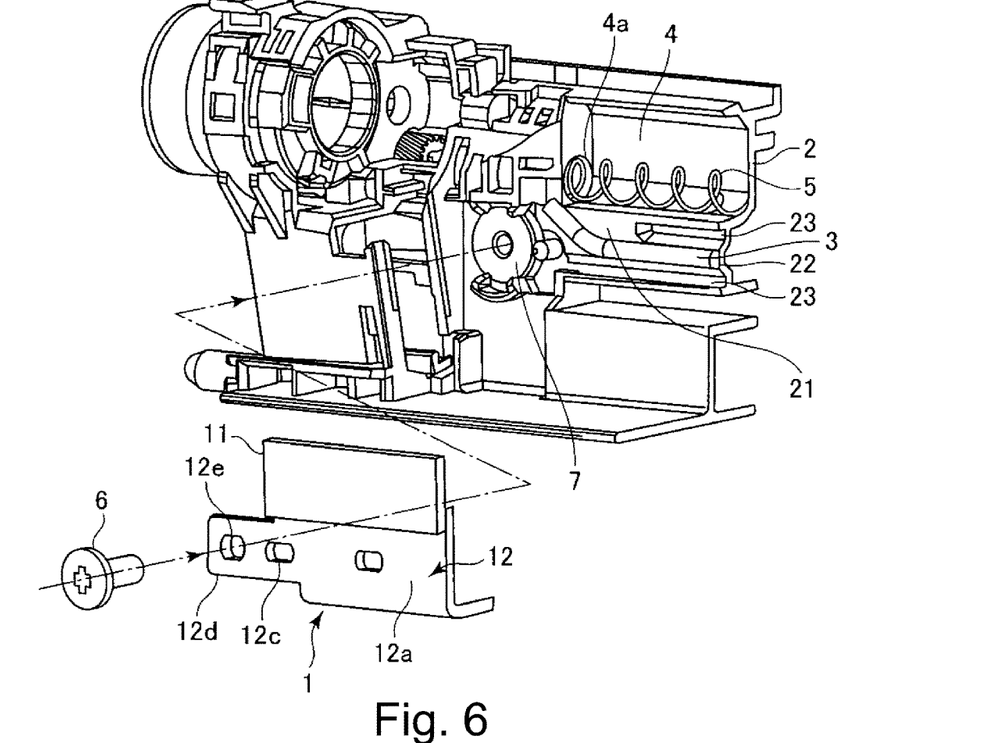
Figure 7:
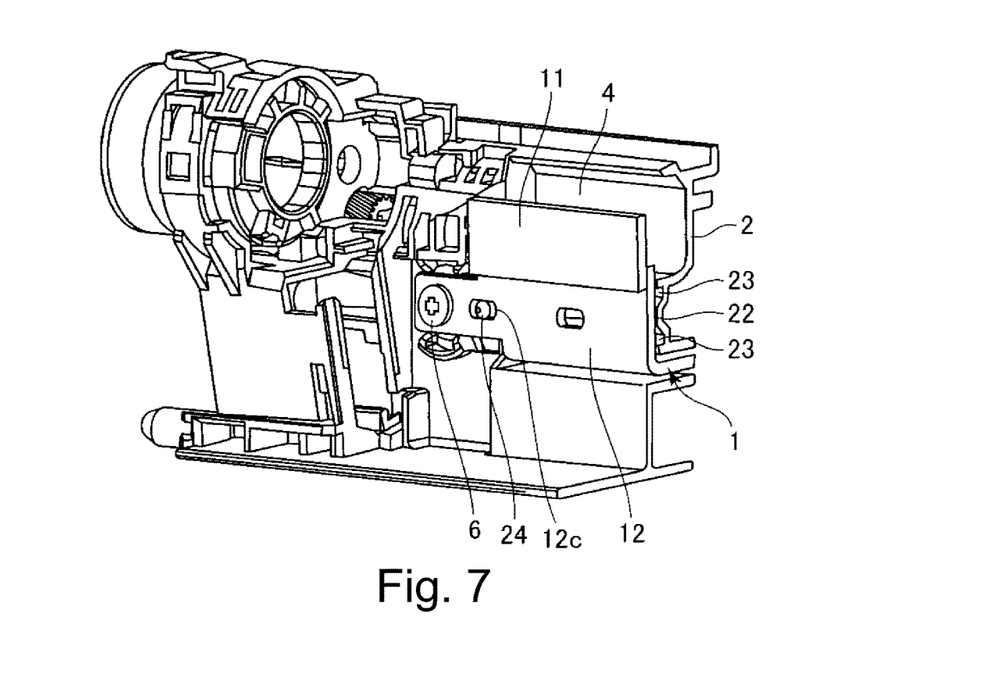

Next, a constitution for mounting the cleaning blade 1 to the cleaning frame 2 will be described. FIG. 4 is a perspective view of the cartridge frame 10, as seen from the photosensitive drum 101 side, in a state in which the cleaning blade 1 is mounted to the cleaning frame 2. FIGS. 5, 6 and 7 are partial perspective views cut along an A-A line shown in FIG. 4. FIG. 5 shows a state before the cleaning blade 1 is mounted to the cleaning frame 2. FIG. 6 shows a state (disassembled state) in which the cleaning blade 1 is being mounted to the cleaning frame 2. FIG. 7 shows a state in which the cleaning blade 1 has been mounted to the cleaning frame 2. Incidentally, with respect to the cleaning device 106 and elements thereof, the rotational axis direction substantially perpendicular to the drawing sheet of FIG. 3 is referred to as the "longitudinal direction". Further, an "up-down direction" with respect to the cleaning device 106 and elements thereof is referred to as the up-down direction, in FIG. 3, corresponding to the up-down direction of the direction of gravitation in this embodiment.

As shown in FIGS. 3 and 5, the cleaning frame 2 includes a wall portion (wall surface) 21 opposing the supporting portion 12 of the cleaning blade 1. As shown in FIGS. 4 and 5, in the neighborhood of each of both end portions of the wall portion 21 with respect to the longitudinal direction, a positioning portion 24 is provided. The positioning portion 24 is a cylindrical projection which is provided integrally with the cleaning frame 2 and which projects from the wall portion 21 in a direction substantially perpendicular to a flat surface of the wall portion 21. On the other hand, as shown in FIGS. 4 and 6, in the neighborhood of each of both end portions of the vertical plate portion 12a of the supporting portion 12, a positioning hole 12c is provided. The hole 12c is configured to engage with the positioning projection 24. Further, as shown in FIG. 4, the end portion frames 8 disposed at end portions of the cleaning frame 2 with respect to the longitudinal direction are provided with drum positioning portions 8a for rotatably positioning the photosensitive drum 101. For this reason, the relative position between the photosensitive drum 101 and the blade portion 11 with respect to X and Z directions shown in FIG. 4 is determined with relatively high accuracy by part (component) accuracy between the cleaning frame 2 and the end portion frames 8 (in the case where the cleaning frame 2 and the end portion frames 8 are integrally formed, single part (component) accuracy). The X and Z directions are flat plane directions which are substantially perpendicular to the drawing sheet of FIG. 3 and which are substantially parallel to the flat surface of the wall portion 21.

As shown in FIG. 5, at each of the end portions of the wall portion 21 with respect to the longitudinal direction, a mounting surface 25 as a fixing portion is provided. The mounting surface 25 is provided on the wall portion 21 so as to project toward the supporting portion 12 side. At a central portion of the mounting surface 25, a fixed hole 26 is provided. On the other hand, as shown in FIG. 6, at each of the end portions of the vertical plate portion 12a of the supporting portion 12 with respect to the longitudinal direction, a portion-to-be-fixed 12d is provided. The portion-to-be-fixed 12d is provided with a through hole 12e. As described above, the supporting portion 12 is disposed on the cleaning frame 2 so that the positioning hole 12c of the supporting portion 12 engages with the positioning projection 24 of the cleaning frame 2, whereby the portion-to-be-fixed 12c of the supporting portion 12 is seated on the mounting surface 25 of the cleaning frame 2. Further, as shown in FIG. 6, a screw 6 as a fixing tool is passed through the through hole 12e of the supporting portion and is threadably fitted in the fixed hole 25 of the cleaning frame 2, whereby the cleaning blade 1 can be fixed to the cleaning frame 2. Incidentally, the position adjusting mechanism will be described later.

At the end portions of the supporting portion 12 with respect to the longitudinal direction, the supporting portion 12 is fixed on the mounting surface 25 provided so as to project toward the supporting portion 12 side, so that the position of the supporting portion 12 with respect to Y direction (i.e., a direction substantially perpendicular to the flat surface of the wall portion 21) shown in FIG. 4 is determined. For that reason, between the mounting surfaces 25 at the longitudinal end portions of the wall portion 21, a gap generates between the supporting portion 12 and the wall portion 21. On the other hand, the toner removed from the surface of the photosensitive drum 101 by the cleaning blade 1 is accommodated in the accommodating portion 4 formed by the cleaning frame 2. The toner accommodated in the accommodating portion 4 is moved by the feeding screw 5 to the outside of the accommodating portion 4 through a discharge opening 4a (FIGS. 5 and 6) provided at one longitudinal end portion of the accommodating portion 4. For that reason, when the gap exists between the supporting portion 12 and the wall portion 21 as described above, the toner accommodated in the accommodating portion 4 leaks from the gap. Although details will be described later, as shown in FIG. 6, in this embodiment, in order to prevent the leakage of the toner, the gap between the supporting portion 12 and the wall portion 21 is sealed with a sealing member 3.

4. Position Adjusting Mechanism

Next, the position adjusting mechanism (adjusting means) for adjusting a relative position of the blade portion 11 to the photosensitive drum 101 in this embodiment will be described.

As described above, as one of factors having the influence on power (cleaning performance) for removing the toner from the surface of the photosensitive drum 101 by the cleaning blade 1, there is a contact pressure of the blade edge portion 11c (FIG. 3) to the surface of the photosensitive drum 101. In this embodiment, the cleaning device 106 is provided with the position adjusting mechanism for adjusting the relative position of the blade portion 11 to the photosensitive drum 101.

In this embodiment, as shown in FIGS. 5 and 6, the position adjusting mechanism is constituted by including an adjusting member 7 disposed between the supporting portion 12 and the mounting surface 25. Further, in this embodiment, by changing a thickness of the adjusting member 7, the relative position of the blade portion 11 to the photosensitive drum 101 is adjusted. Incidentally, the thickness of the adjusting member 7 is a thickness of the adjusting member 7 with respect to a direction of the adjusting member 7 sandwiched between the supporting portion 12 and the mounting surface 25 (i.e., a direction substantially perpendicular to the mounting surface 25), and may also be the thickness of a single adjusting member 7 and a total thickness of a plurality of adjusting members 7.

In this embodiment, the adjusting member 7 is constituted by a ring-shaped (substantially circular) sheet-like member, in a plan view, provided with a central through hole 7a. The adjusting member 7 can be formed of an arbitrary material such as plastic, metal, paper or cloth, but is formed of metal in this embodiment. The adjusting member 7 is disposed on the mounting surface 25 so that the through hole 7a thereof coincides with the fixed hole 26. Further, the screw 6 is passed through the through hole 12e of the supporting portion 12 and the through hole 7a of the adjusting member 7 and then is threadably fitted in the fixed hole 26, so that the adjusting member 7 is sandwiched between the portion-to-be-fixed 12d of the supporting portion 12 and the mounting surface 25 of the cleaning frame 2. The thickness of the adjusting member 7 is determined depending on a desired change amount of the penetration amount of the blade edge portion 11c into the surface of the photosensitive drum 101.

Figure 8:
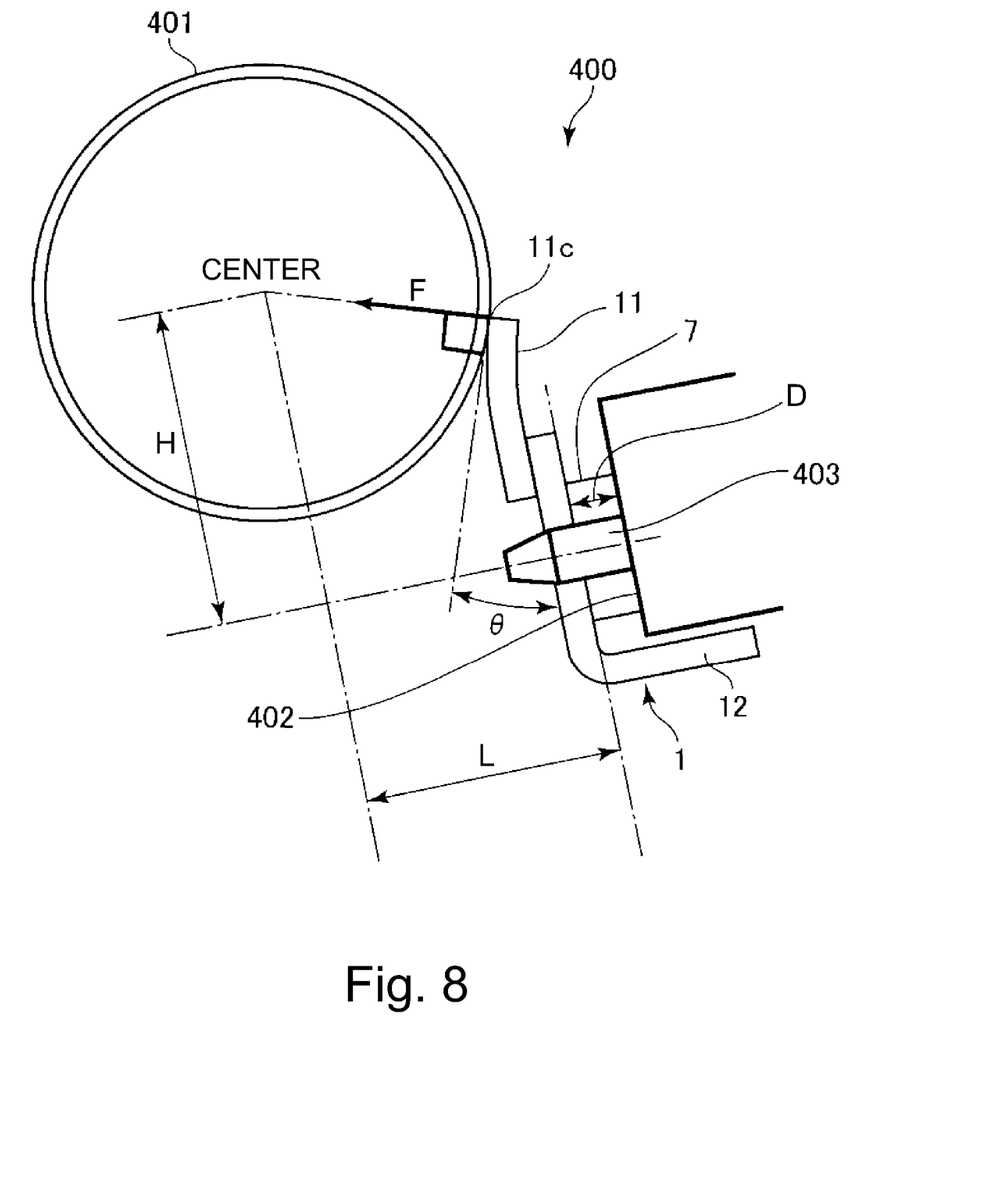
FIG. 8 is a sectional view for illustrating a position adjusting method of the cleaning blade.

Next, an example of a position adjusting method by the position adjusting mechanism, i.e., a method of determining the thickness of the adjusting member 7 for causing the contact pressure of the blade edge portion 11c to the photosensitive drum 101 to fall within a predetermined range will be described. FIG. 8 is a sectional view (cross section substantially perpendicular to the longitudinal direction of the cleaning blade 1) showing a state in which the cleaning blade 1 is mounted to a measuring device 400 for determining (measuring) the thickness of the adjusting member 7.

The measuring device 400 includes a dummy drum 401, a bearing surface 402 and a boss 403 which corresponds to the photosensitive drum 101, the mounting surface 25 and the positioning portion 25, respectively, in the drum cartridge 112. To the dummy drum 401, a load sensor is mounted so that the contact pressure of the blade edge portion 11c to the surface of the dummy drum 401 can be measured. A distance L, a distance H and an angle θ in FIG. 8 are predetermined values of reference setting. The distance L is a distance (with respect to a direction substantially perpendicular to the bearing surface) between a rotation center of the dummy drum 401 and a surface of the vertical plate portion 12a of the supporting portion 12 on the bearing surface 402 side. The distance H is a distance (with respect to a planar direction substantially parallel to the bearing surface 402) between the rotation center of the dummy drum 401 and a center of the boss 403. The angle θ is an angle formed by a tangential line of the dummy drum 401 at a contact portion with the blade edge portion 11c and a rectilinear line substantially parallel to the surface of the vertical plate portion 12a of the supporting portion 12 on the photosensitive drum 101 side.

In a state in which the cleaning blade 1 is disposed and fixed in the measuring device 400 under the above-described reference setting, a contact pressure F of the blade edge portion 11c to the dummy drum 401 is measured. In general, the contact pressure F at this time has a deviation from a design nominal value Fs. As causes of generation of this deviation between the contact pressure F and the nominal value Fs, variations of hardness of the blade portion 11, a projection length from the supporting portion 12 of the blade portion 11 and a degree of warpage of the blade portion 11 exist. By changing a thickness D of the adjusting member 7, the penetration amount of the blade edge portion 11c into the surface of the dummy drum 401 is adjusted so that the contact pressure F approaches the nominal value Fs.

In this embodiment, under the reference setting, a single adjusting member 7 having a predetermined thickness D is disposed. In the case where the contact pressure F satisfies: F<Fs+α (in the case where the contact pressure is smaller than a predetermined range), one adjusting member 7 having the predetermined thickness D is added, so that the thickness of the adjusting member 7 is made 2d and thus the contact pressure F is caused to fall within the predetermined range. On the other hand, the contact pressure F satisfies: F>Fs−β (in the case where the contact pressure is larger than the predetermined range), the adjusting member 7 is removed, so that the contact pressure F is caused to fall within the predetermined range. At this time, the contact pressure may also be measured again by actually changing the thickness of the adjusting member 7 and the thickness (including the case of the thickness of 0 of the adjusting member 7 for causing the contact pressure to fall within the predetermined range may also be only determined. Values of +α and −β are determined from a range of a desired contact pressure, ranges of variations of the cleaning blade 1 as described above, the number of usable sheets for the adjusting member 7, and the like.

Further, during fixing of the cleaning blade 1 to the cleaning frame 2, the adjusting member 7 having the thickness (the number of adjusting members) determined as described above is disposed between the supporting portion 12 and the mounting surface 25.

5. Sealing Member

When the relative position of the blade edge portion 11c to the surface of the photosensitive drum 101 is adjusted by changing the thickness of the adjusting member 7 as described above, a magnitude of the gap between the supporting portion 12 and the wall portion 21 and between the mounting surfaces 25 at both end portions of the wall portion 21 with respect to the longitudinal direction of the wall portion 21 changes. Here, as in the conventional constitution, it would be considered that the gap between the supporting portion 12 and the wall portion 21 is sealed with an elastic seal member formed of an urethane foam rubber. However, in such a constitution, for example, in the case where the gap between the supporting portion 12 and the wall portion 21 is adjusted so as to be relatively increased, there is a liability that a sealing (seal) property of the elastic seal member becomes insufficient and the toner leaks out. Further, for example, in the case where the gap between the supporting portion 12 and the wall portion 21 is adjusted so as to be relatively decreased, there is a liability that a repelling force of the elastic seal member becomes large and has the influence on straightness of the cleaning blade 1. For that reason, in such a constitution, the case where it is difficult to sufficiently broaden an adjusting range of the relative position of the cleaning blade 1 to the photosensitive drum 101 exists in some instances.

Therefore, in this embodiment, as shown in FIGS. 5 and 6, the wall portion 21 of the cleaning frame 2 has the following constitution. That is, the wall portion 21 includes a disposing portion 22 where the sealing member 3 is disposed and includes recessed portions 23 which are provided on both sides with respect to a direction crossing an extension direction of the disposing portion 22 and which are recessed from a level of the disposing portion 22 in an direction opposite from the supporting portion 12. The recessed portions 23 are disposed on the both sides of the disposing portion 22 in a state in which the sealing member 3 has flowability and are capable of accommodating the sealing member 3 flowing from between the supporting portion 12 and the disposing portion 22. In the following, this will be further specifically described.

In this embodiment, as shown in FIG. 5, in a region between the mounting surfaces 25 at the both longitudinal end portions of the wall portion 21, the disposing portion (disposing surface) 22 where the sealing member 3 is disposed is provided. The disposing portion 22 extends along the longitudinal direction of the accommodating portion 4 (in this embodiment, extends substantially in parallel to the longitudinal direction of the cleaning blade 1) over substantially an entire longitudinal region of the accommodating portion 4. Further, the disposing portion 22 is provided so as to face a portion immediately under the accommodating portion at both longitudinal end portions of the accommodating portion 4. Further, as shown in FIG. 6, the sealing member 3 in the state that the sealing member 3 has the flowability is disposed in the disposing portion 22. The sealing member 3 is disposed not only along the extension direction of the disposing portion 22 but also so as to be curved (bent) upward to face the portion immediately under the accommodating portion 4 at the both longitudinal end portions of the accommodating portion 4. In this embodiment, as the sealing member 3, a hot-melt adhesive is used. The sealing member 3 constituted by the hot-melt adhesive is applied in a heated and fused state onto the disposing portion 22. As specifically described later, the sealing member 3 is applied in a sufficiently swelled state onto the disposing portion 22.

Further, in this embodiment, in the region between the mounting surfaces 25 between the both longitudinal end portions of the wall portion 21, on both sides of the disposing portion 22 with respect to the direction crossing the extension direction of the disposing portion 22, the recessed portions (grooves) 23 recessed from the level of the disposing portion 22 in the direction opposite from the supporting portion 12 are provided. The recessed portions 23 extend along the longitudinal direction of the accommodating portion 4 (in this embodiment, extend substantially in parallel to the longitudinal direction of the cleaning blade 1) over substantially the entire longitudinal direction of the accommodating portion 4. Specifically, in this embodiment, the recessed portion 23 disposed below the disposing portion 22 has a length substantially equal to a longitudinal length of the accommodating portion 4, and a length of the recessed portion 23 disposed above the disposing portion 22 is shorter than the longitudinal length of the accommodating portion 4. As a result, the sealing member 3 can face the portion immediately under the accommodating portion 4. Further, as specifically described later, the recessed portions 23 are constituted so that the recessed portions 23 can accommodate the sealing member 3 protruded from the gap between the supporting portion 12 and the disposing portion 22 in the state in which the sealing member 3 still has the flowability.

The sealing member 3 disposed on the disposing portion 22 is solidified (loses the flowability thereof) when the temperature thereof is a normal temperature and closely contacts both of the supporting portion 12 and the wall portion 21 (specifically the disposing portion 22), so that the sealing member 3 seals the gap between the supporting portion 12 and the wall portion 21 and thus prevents the toner from flowing out through the gap.

Figure 9:
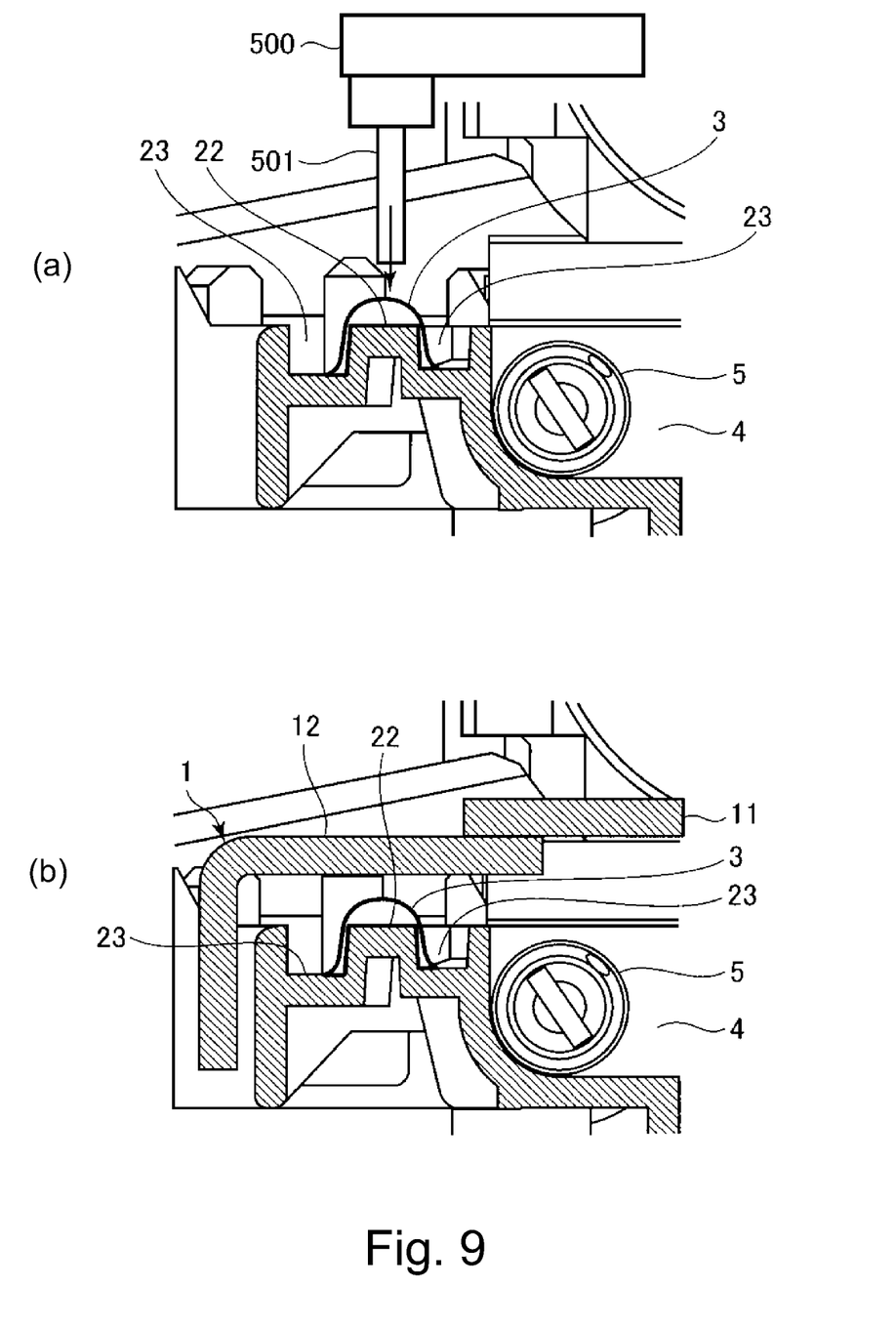
Figure 10:
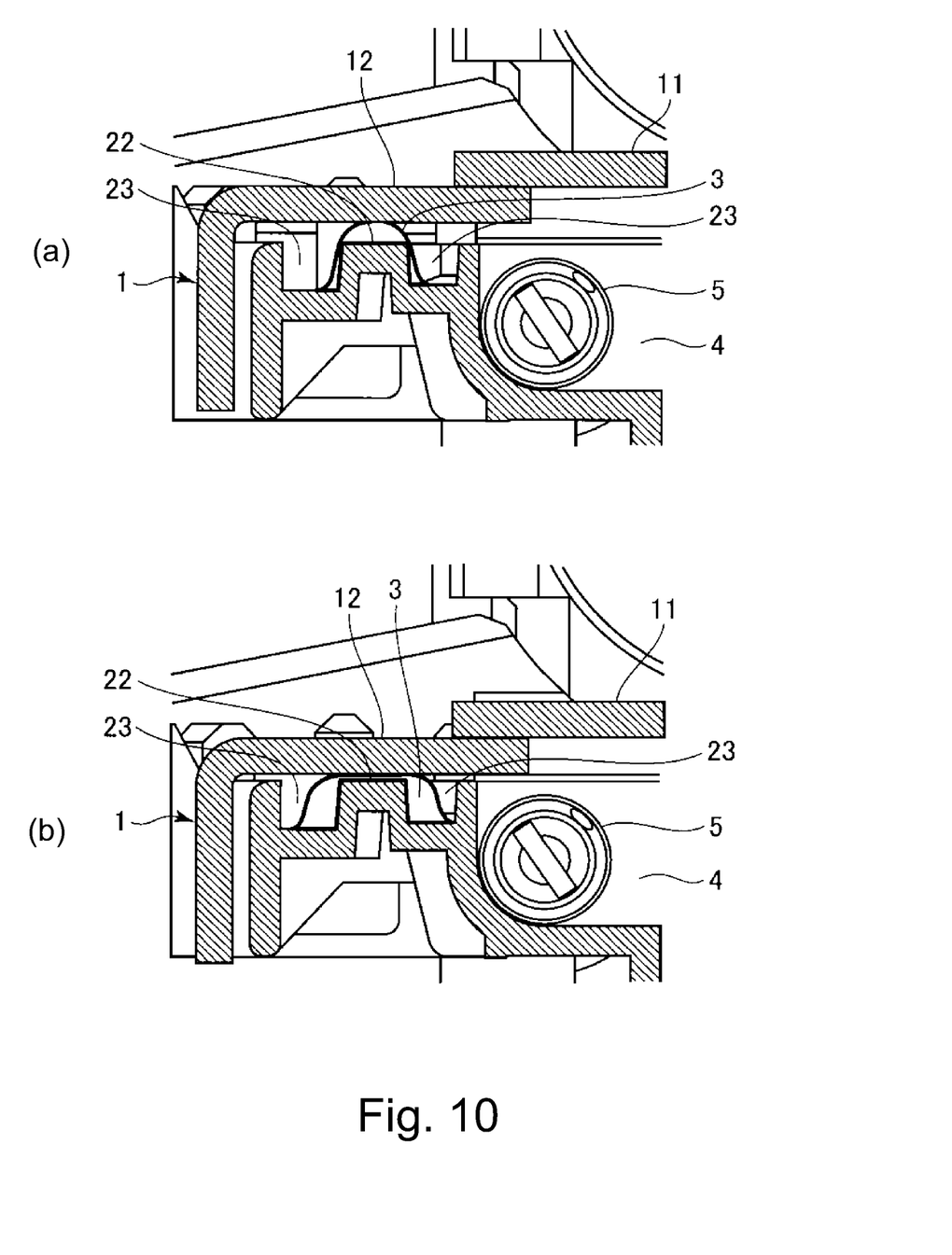

6. Mounting Procedure of Cleaning Blade and Setting of Sealing Member and Recessed Portion Next, a mounting procedure of the cleaning blade 1 to the cleaning frame 2 and setting of the sealing member 3 and the recessed portions 23 will be further described. FIGS. 9 and 10 are sectional views (cross sections substantially perpendicular to the longitudinal direction of the cleaning blade 1) of a neighborhood of the disposing portion 22 and the recessed portions 23 for illustrating the mounting procedure of the cleaning blade 2 to the cleaning frame 2.

Part (a) of FIG. 9 shows a state before the cleaning blade 1 is mounted to the cleaning frame 2. The sealing member 3 constituted by the hot-melt adhesive is ejected from a nozzle 501 of a heat-ejection device 500 in a state in which the sealing member 3 is heated and fused (melted) by the heat-ejection device 500. The ejected sealing member 3 is applied onto the disposing portion 22. As shown in part (a) of FIG. 9, typically, in a state in which the cleaning frame 2 is disposed so that the disposing portion 22 and the recessed portions 23 are oriented upward, application of the sealing member 3 onto the disposing portion 22 is carried out. At this time, in this embodiment, an application condition such as a temperature is adjusted so that the sealing member 3 is applied onto the disposing portion 22 so as to be swelled to about 2-3 mm in thickness from the disposing portion 22.

Here, as a material constituting the sealing member 3, it is desirable that a material which has flowability and viscosity during assembling of the cleaning device 106 (during disposition of the sealing member 3 and during mounting of the cleaning blade 1) and which can be applied onto the disposing portion 22 with swelling of about 2-3 mm is used. Further, the material constituting the sealing member 3 may desirably be capable of being deformed easily depending on the contact pressure also during use of the cleaning device 106. Further, the material constituting the sealing member 3 may desirably have viscosity at a surface (surface layer portion) thereof during either of assembling and use of the cleaning device 106.

As the material constituting the sealing member 3, the hot-melt adhesive can be preferably used as in this embodiment. As the hot-melt adhesive, a hot-melt adhesive principally constituted appropriately by an arbitrary thermoplastic resin material. For example, hot-melt adhesives of EVA (ethylene-vinyl acetate (copolymer)) type, PO (polyolefin) type, PA (polyamide) type, SR (synthetic rubber) type, ACR (acrylic) type, PUR (polyurethane) type and the like type can be used. In this embodiment, the hot-melt adhesive having the above-described properties, typically the hot-melt adhesive of the PO (polyolefin) type was used. That is, the hot-melt adhesive used in this embodiment has the flowability and the viscosity in the heated and fused state and can be applied while being formed and swelled to about several mm (2-3 mm) in thickness on the disposing portion 22. Further, the hot-melt adhesive used in this embodiment can be easily deformed depending on the contact pressure even after returned to the normal temperature. Further, the hot-melt adhesive used in this embodiment has the viscosity at the surface (surface layer portion) thereof even in either of a heated state and a normal temperature state. That is, in this embodiment, the sealing member 3 not only exhibits the flowability and the viscosity in the heated state but also exhibits viscoelasticity in a solidified state.

Part (b) of FIG. 9 shows a state during mounting of the cleaning blade 1 to the cleaning frame 2. As described above, after the sealing member 3 is applied onto the disposing portion 22, the adjusting member 7 is incorporated in the cleaning frame 2 so as to have the thickness (the number of adjusting members) determined as described above, and thereafter, the cleaning blade 1 is assembled with the cleaning frame 2 a described above. Thereafter, as shown in parts (a) and (b) of FIG. 10, the cleaning blade 1 is mounted (attached) to the cleaning frame 2. At this time, the distance between the supporting portion 12 and the disposing portion 22 varies depending on the thickness of the adjusting member 7, and therefore, the state of the sealing member 3 changes. Next, in each of the case where the thickness of the adjusting member 7 is smaller than a thickness in the reference setting and the case where the thickness of the adjusting member is larger than the thickness in the reference setting, the state of the sealing member 3 will be described.

First, the case where the thickness of the adjusting member 7 is larger than the thickness in the reference setting (in the case where the above-described contact pressure F is smaller than the nominal value Fs) will be described. In this case, as shown in part (a) of FIG. 10, the cleaning blade 1 is mounted to the cleaning frame 2 in a state in which the gap between the supporting portion 12 and the disposing portion 22 is larger than a gap in the reference setting. For this reason, the sealing member 3 is needed to be applied onto the disposing portion 22 with a swelling height necessary to fill (close) the gap between the supporting portion 12 and the disposing portion 22 in the case where the distance between the supporting portion 12 and the disposing portion 22 becomes maximum. That is, there is a need to increase the swelling height, during application of the sealing member 3 onto the disposing portion 22, with an increasing adjusting range of the relative position of the cleaning blade 1 to the photosensitive drum 101 by the adjusting member 7. The hot-melt adhesive constituting the sealing member 3 used in this embodiment has the viscosity at the surface thereof. For that reason, even in a state in which the press-contact force acting on the sealing member 3 between the supporting portion 12 and the disposing portion 22, the sealing member 3 closely contacts both of the supporting portion 12 and the disposing portion 22 due to the viscosity thereof, and seals the gap between the supporting portion 12 and the disposing portion 22 and thus can prevent flowing-out of the toner through the gap. Next, the case where the thickness of the adjusting member 7 is smaller than the thickness in the reference setting (in the case where the above-described contact pressure F is larger than the nominal value Fs) will be described. In this case, as shown in part (b) of FIG. 10, the cleaning blade 1 is mounted to the cleaning frame 2 in a state in which the gap between the supporting portion 12 and the disposing portion 22 is smaller than a gap in the reference setting. On the other hand, as described above, the sealing member 3 is applied onto the disposing portion 22 with a swelling height necessary to fill (close) the gap between the supporting portion 12 and the disposing portion 22 in the case where the distance between the supporting portion 12 and the disposing portion 22 becomes maximum (part (a) of FIG. 10). For this reason, for example, in the case where the distance between the supporting portion 12 and the disposing portion 22 becomes minimum, a volume of the gap between the supporting portion 12 and the disposing portion 22 is in a state in which the volume is smaller than a volume of the sealing member 3 applied onto the disposing portion 22. Then, a compression ratio of the sealing member 3 becomes large, so that the sealing member 3 which cannot be completely accommodated in the narrowed gap protrudes from the gap between the supporting portion 12 and the disposing portion 22. At this time, in this embodiment, the recessed portions 23 are disposed adjacently to the disposing portion 22 and therefore, the sealing member 3 protruded from the gap between the supporting portion 12 and the disposing portion 22 is accommodated in the recessed portions 23.

Here, a volume (total volume of the recessed portions 23 on the both sides of the disposing portion 22) of the recessed portions 23 is Vc. This volume Vc is a volume of a space enclosed by extended lines of a plane of the disposing portion 22 and inner walls of the recessed portions 23. A volume of the sealing member 3 in the case where an application amount of the sealing member 3 becomes maximum is Vm. Further, a volume of the gap between the supporting portion 12 and the disposing portion 22 in the case where the thickness of the adjusting member 7 is minimum and the distance between the supporting portion 12 and the disposing portion 22 is minimum in consideration of other variations (such as part component) tolerance is Vs. At this time, the volume Vc is set so as to satisfy the following relationship:

$$Vc > Vm - Vs.$$

As a result, the sealing member 3 protruding from the gap between the supporting portion 12 and the disposing portion 22 can be sufficiently accommodated in the recessed portions 23. That is, in this embodiment, the cleaning device 106 is capable of changing the magnitude of the gap between the supporting portion 12 and the wall portion 21 and includes the adjusting member 7 disposed, between the supporting portion 12 and the wall portion 21, as an adjusting means for adjusting the magnitude of the gap between the supporting portion 12 and the wall portion 21. At this time, the recessed portions 23 are constituted so as to have a volume capable of permitting accommodation of the sealing member 3 flowing through the gap between the supporting portion 12 and the disposing portion 22 in the case where the gap between the supporting portion 12 and the wall portion 21 is minimum in a variable range of the gap.

Thus, in this embodiment, the recessed portions 23 having a sufficient volume are provided adjacently to the disposing portion 22 in which the sealing member 3 in a state in which the sealing member 3 has the flowability is disposed. That is, the sealing member 3 in an amount in which the sealing member 3 is applied onto the disposing portion 22 and is protruded from the gap between the supporting portion 12 and the disposing portion 22 by being pressed by the supporting portion 12 is accommodated in the recessed portions 23. As a result, even in the case where a fluctuation of the gap to be sealed with the sealing member 3 is relatively large, a repelling force is reduced, so that positional accuracy of the cleaning blade 1 can be stably maintained. Further, the sealing member 3 protruded from the gap contacts the feeding screw 5 in the accommodating portion 4, so that a possibility of generation of an improper operation of the cleaning device 106 can be reduced.

Further, in this embodiment, even in the case where the gap to be sealed with the sealing member 3 is maximum, the flowing-out of the toner can be prevented by disposing the sealing member 3 having a height satisfying the gap. In addition, even in the case where the gap is minimum, the sealing member 3 protruded from the gap is moved to and accommodated in the recessed portions 23, so that the repelling force of the sealing member 3 can be lowered. That is, even when the sealing member 3 in an amount (height) in which the gap can be sealed with the sealing member 3 during a maximum gap (state) is applied onto the disposing portion 22, the sealing member 3 compressed during a minimum gap (state) is retracted to and accommodated in the recessed portions 23, and therefore, it is possible to suppress an excessive increase of a reaction force of the compressed sealing member 3. For that reason, an increase of a repelling force of the sealing member 3 due to a fluctuation of the gap can be suppressed while sufficiently broadening the adjusting range of the relative position of the cleaning blade 1 to the photosensitive drum 101 and while satisfactorily sealing the gap between the supporting portion 12 and the wall portion 21.

Further, in this embodiment, by using the sealing member 3 having the viscosity, the flowing-out of the toner can be prevented even in the case where a width of the sealing member 3 (i.e., a volume of the sealing member 3) with respect to a direction crossing the extension direction of the sealing member 3 is made relatively small. That is, by using the sealing member 3 having the viscosity at the surface thereof, the flowing-out of the toner can be prevented when the sealing member 3 closely contacts both of the supporting portion 12 and the disposing portion 22 even in a slight amount. For that reason, a total amount (sealing region width) of the sealing member 3 is reduced, so that a total amount of the sealing member 3 retracted to the recessed portions 23 can be reduced. As a result, it is possible to not only reduce an amount of use of the sealing member 3 but also further decrease the repelling force of the sealing member 3.

As described above, according to this embodiment, it is possible to suppress an increase of the repelling force of the sealing member 3 due to a change of the gap between the supporting portion 21 and the wall portion 21 while improving a cleaning performance by adjusting the relative position of the cleaning blade 1 to the photosensitive drum 101. Further, a possibility of the generation of the improper operation of the cleaning device 106 by the protruded sealing member 3 can be reduced.

Embodiment 2

Next, another embodiment of the present invention will be described. Basic constitution and operation of an image forming apparatus of this embodiment are similar to those in Embodiment 1. Accordingly, elements having identical or corresponding functions or constitutions to those of the image forming apparatus of Embodiment 1 are represented by the same reference numerals or symbols as those in Embodiment 1 and will be omitted from detailed description.

In Embodiment 1, the present invention was applied to the drum cleaning device 106. On the other hand, in this embodiment, the present invention is applied to a belt cleaning device 108.

Figure 11:
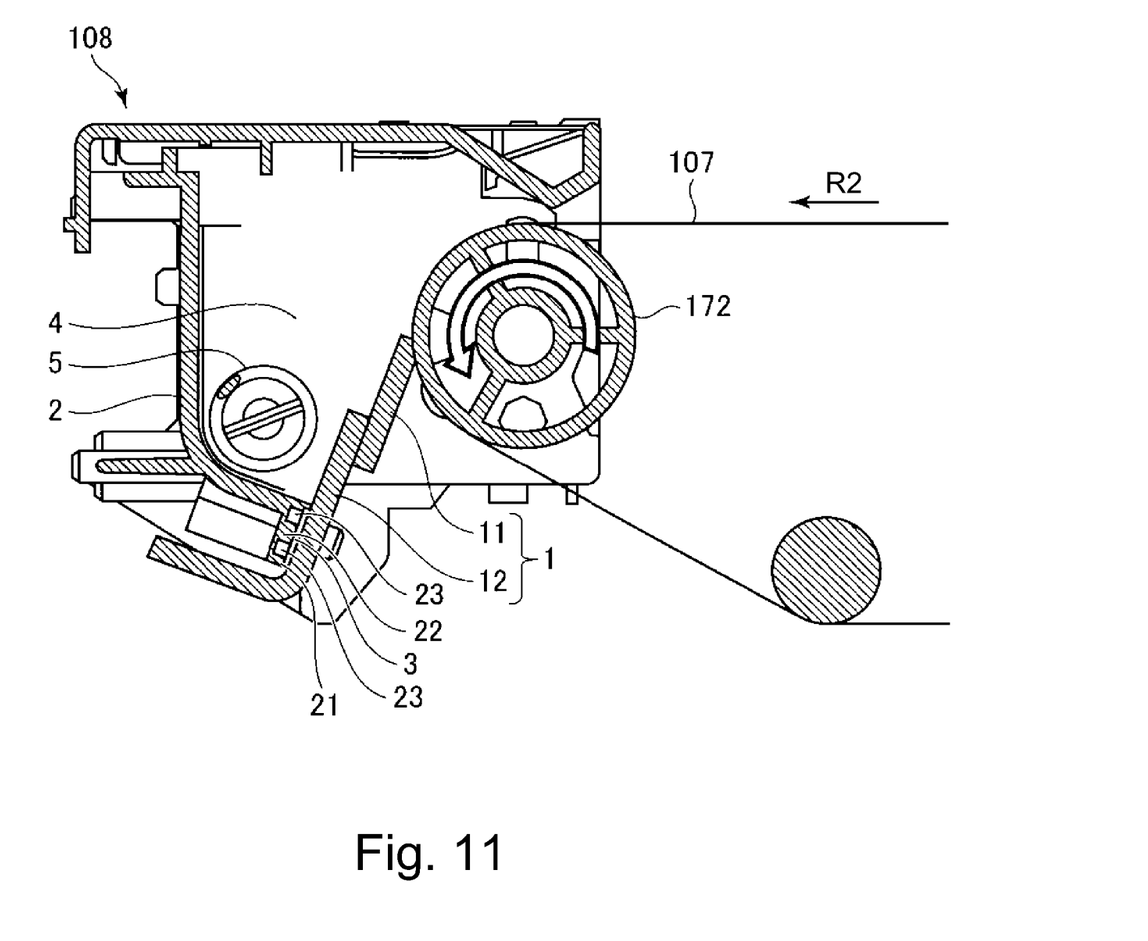
FIG. 11 is a sectional view of a belt cleaning device and a neighborhood thereof.

FIG. 11 is a sectional view (cross-section substantially perpendicular to the rotational axis direction of the photosensitive drum 101) of a neighborhood of the belt cleaning device 108 in this embodiment. Incidentally, in the embodiment shown in FIG. 11, a constitution of stretching rollers for the intermediary transfer belt 107 is different from that of Embodiment 1, but the action of the intermediary transfer belt 107 is substantially identical to that of Embodiment 1.

The belt cleaning device 108 includes, similarly as in Embodiment 1, a cleaning blade 1, a cleaning frame 2 constituting an accommodating portion 4, and a feeding screw 5. The cleaning frame 2 includes a wall portion 21 opposing a supporting portion 12 of the cleaning blade 1. The supporting portion 12 of the cleaning blade 1 is fixed to a wall portion 21 in the neighborhood of each of longitudinal end portions. Further, similarly as in Embodiment 1, a relative position of the cleaning blade 1 to a photosensitive drum 101 can be adjusted by a position adjusting mechanism. Further, the wall portion 21 includes, similarly as in Embodiment 1, a disposing portion 22 in which the sealing member 3 is disposed and recessed portions 23 provided adjacently to the disposing portion 22.

Thus, the present invention is applicable to also the belt cleaning device 108, and an effect similar to that of Embodiment 1 can be obtained.

Similarly, when a cleaning device for removing the developer from a surface of a rotatable member on which the developer can be deposited is used, an effect similar to those of the above-described embodiments can be obtained by applying the present invention to the cleaning device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-100219 filed on May 19, 2017, which is hereby incorporated by reference herein in its entirety.

What is claimed is:

1. A cleaning device for removing toner from a surface of an image bearing member, comprising:
    a cleaning portion including a blade and a blade supporting member,
        wherein said blade is contacted to the image bearing member at one edge portion with respect to a short length direction perpendicular to a longitudinal direction and a thickness direction of said blade, and
        wherein said blade supporting member includes a flat surface portion and supports said blade at a position opposite from said edge portion with respect to the short length direction;
    a cleaning frame on which said blade supporting member is mounted and including mounting portions, a disposing portion and spacing portions at a position opposing the flat surface portion,
        wherein said mounting portions are provided at a position corresponding to each of neighborhoods of end portions of said flat surface portion with respect to the longitudinal direction, and said blade supporting member is mounted on said cleaning frame at said mounting portions,
        wherein said disposing portion opposes said flat surface portion with a gap with respect to the thickness direction and extends in the longitudinal direction in a region between said mounting portions with respect to the longitudinal direction, and
        wherein said spacing portions are adjacent to respective sides of said disposing portion with respect to the short length direction, and extend in the longitudinal direction; and
    a sealing member formed of a thermoplastic resin material having flowability and viscosity in a heat-fusing state and configured to seal the gap by a portion thereof extending in the longitudinal direction between said disposing portion and said flat surface portion,
        wherein said spacing portions are retracted to said disposing portion in the thickness direction so that distances between said flat surface portion and each of said spacing portions with respect to the thickness direction are greater than the gap, and spaces between each of said spacing portions and said flat surface portion are configured to accommodate said sealing member protruded from the gap.

2. A cleaning device according to claim 1, wherein said disposing portion has a planar shape parallel to said flat surface portion, and in a plane perpendicular to the longitudinal direction at a central position of said blade with respect to the longitudinal direction, each of said spacing portions has a recessed shape, and
    wherein the following relationship is satisfied:

$$Vc > Vm - Vs,$$

where Vc is a sum of volumes of said spacing portions each defined by an extended plane of the planar shape and an inner wall of the recessed shape, Vm is a volume of said sealing member, and Vs is a volume of the gap between said flat surface portion and the planar shape.

3. A cleaning device according to claim 1, wherein said cleaning frame further comprises an adjusting mechanism configured to adjust a position of said flat surface portion relative to said cleaning frame with respect to the thickness direction.

4. A cleaning device according to claim 3, wherein said adjusting mechanism includes a spacer sandwiched between said cleaning frame and said flat surface portion.

5. A cleaning device according to claim 3, wherein said adjusting mechanism includes a spacer sandwiched between a periphery of said mounting portions and said flat surface portion.

6. A cleaning device according to claim 1, wherein said sealing member is a hot-melt adhesive.

7. An image forming apparatus according to claim 1, wherein said disposing portion is provided in a range where said mounting portions are provided in the short length direction.

8. An image forming apparatus according to claim 1, wherein a part of said sealing member is accommodated in the spaces.

9. An image forming apparatus comprising:
    an image bearing member;
    a toner image forming portion configured to form a toner image on a surface of said image bearing member;
    a cleaning device configured to remove toner from the surface of said image bearing member said cleaning device, comprising:
    a cleaning portion including a blade and a blade supporting member,
        wherein said blade is contacted to the image bearing member at one edge portion with respect to a short length direction perpendicular to a longitudinal direction and a thickness direction of said blade, and wherein said blade supporting member includes a flat surface portion and supports said blade at a position opposite from said edge portion with respect to the short length direction;

a cleaning frame on which said blade supporting member is mounted and including mounting portions, a disposing portion and spacing portions at a position opposing the flat surface portion, wherein said mounting portions are provided at a position corresponding to each of neighborhoods of end portions of said flat surface portion with respect to the longitudinal direction, and said blade supporting member is mounted on said cleaning frame at said mounting portions, wherein said disposing portion opposes said flat surface portion with a gap with respect to the thickness direction and extends in the longitudinal direction in a region between said mounting portions with respect to the longitudinal direction, and wherein said spacing portions are adjacent to respective sides of said disposing portion with respect to the short length direction, and extend in the longitudinal direction; and a sealing member formed of a thermoplastic resin material having flowability and viscosity in a heat-fusing state and configured to seal the gap by a portion thereof extending in the longitudinal direction between said disposing portion and said flat surface portion, wherein said spacing portions are retracted to said disposing portion in the thickness direction so that distances between said flat surface portion and each of said spacing portions with respect to the thickness direction are larger than the gap, and spaces between each of said spacing portions and said flat surface portion are configured to accommodate said sealing member protruded from the gap.

10. An image forming apparatus according to claim 9, wherein said image bearing member is a photosensitive member configured to carry the toner image.

11. An image forming apparatus according to claim 9, wherein said image bearing member is an intermediary transfer member configured to carry the toner image primary-transferred at a primary transfer portion and then secondary-transferred onto a recording material at a secondary transfer portion.

12. An image forming apparatus according to claim 9, wherein said disposing portion is provided in a range where said mounting portions are provided in the short length direction.

13. An image forming apparatus according to claim 9, wherein a part of said sealing member is accommodated in the spaces.

14. An image forming apparatus according to claim 9, wherein said disposing portion has a planar shape parallel to said flat surface portion, and in a plane perpendicular to the longitudinal direction at a central position of said blade with respect to the longitudinal direction, each of said spacing portions has a recessed shape adjacent to respective sides of said disposing portion with respect to the short length direction, and wherein the following relationship is satisfied:

$$Vc > Vm - Vs,$$

where $Vc$ is a sum of volumes of said spacing portions each defined by an extended plane of the planar shape and an inner wall of the recessed shape, $Vm$ is a volume of said sealing member, and $Vs$ is a volume of the gap between said flat surface portion and the planar shape.

* * * * *